United States Patent [19]

Millheiser et al.

[11] 3,934,315

[45] Jan. 27, 1976

[54] HELICAL-SPRING FASTENED ASSEMBLIES

[75] Inventors: Melvin Millheiser, North Bellmore; Hugo Wurzel, New York, both of N.Y.

[73] Assignee: Waldes Kohinoor, Inc., Long Island City, N.Y.

[22] Filed: July 26, 1974

[21] Appl. No.: 492,142

[52] U.S. Cl. .............................. 24/230 SL; 285/318
[51] Int. Cl.² ................... F16L 39/00; A44B 19/00
[58] Field of Search... 24/230 R, 279, 257 R, 230 SL, 24/155 C; 285/303, 318

[56] References Cited
UNITED STATES PATENTS

| | | | |
|---|---|---|---|
| 955,650 | 4/1910 | Maier | 285/318 X |
| 995,744 | 6/1911 | Watkins | 24/155 C |
| 1,711,995 | 5/1929 | Erickson | 285/318 |
| 1,814,479 | 7/1931 | Metcalf | 285/318 |
| 2,574,034 | 11/1951 | Heimann | 24/279 UX |

*Primary Examiner*—Donald A. Griffin
*Attorney, Agent, or Firm*—J. Harold Kilcoyne

[57] ABSTRACT

A multi-coil helical spring-fastened assembly of first and second sub-assemblies of which one of said sub-assemblies has general housing-member form and the other sub-assembly has general shaft, rod or tube form and being dimensioned for ready insertion in the bore of said housing member; one of said sub-assemblies incorporating a multi-coil helical spring located between an integral shoulder thereof and an artificial shoulder, i.e. a groove-seated spring retaining ring; said helical spring being in torsion responsive to the sub-assemblies being assembled by insertion of one into the bore of the other whereby each of the multi-coils of the spring exerts a gripping force in radial direction on the housing-bore surface, or conversely on the shaft, rod or tube outer surface.

1 Claim, 9 Drawing Figures

U.S. Patent   Jan. 27, 1976   3,934,315

HELICAL-SPRING FASTENED ASSEMBLIES

This invention relates to improvements in helical-spring fastened assemblies, and more particularly to an assembly wherein a multi-coil helical spring of a sub-assembly is so arranged and mounted as to act in torsion and in so doing exerts gripping force on a housing-bore surface, or conversely on the outer cylindrical surface of a shaft, rod, tube or tube-end of a sub-assembly to be fastened, responsive to the sub-assemblies being brought together and assembled one to the other.

BACKGROUND OF THE INVENTION

Assemblies incorporating a helical spring and means for causing said spring to act in torsion and in so doing to exert frictional gripping forces on a housing-bore surface, or conversely on a shaft, rod or tube outer surface, are known in the prior art, examples of patents broadly utilizing the idea being Diescher No. 631,956 dated Aug. 29, 1899; Kaman et al. U.S. Pat. No. 2,890,027 dated June 9, 1959; Keden U.S. Pat. No. 3,230,595 dated Jan. 25, 1966; and Norton et al. U.S. Pat. No. 3,517,184 dated June 3, 1970. However, no one of these prior art patents or any other patent known to applicants teaches or suggests the use of conventional retaining ring-in-groove means, the simplicity and effectiveness of which is widely known and utilized in countless other and diverse assemblies, as an artificial shoulder-forming means which functions in concert with a natural shoulder to position a multi-coil helical spring so that it may act like a torsion spring, and which in so doing, generates friction gripping forces effective on a housing-bore surface, or conversely on a shaft or a rod surface or on the outer surface of a tube or tube-end, for example.

SUMMARY OF THE INVENTION

According to one form of the invention, there is provided a shaft, rod, or tube sub-assembly incorporating a multi-coil helical spring having uniform outer diameter which is oversize in relation to that of said shaft, rod, etc., but which is normally held in place thereon, i.e. against a step or shoulder, by an artificial shoulder-forming retaining ring of conventional construction spring-seated in a groove machined or otherwise formed in said shaft, rod, etc. surface. Said sub-assembly is designed to be bodily pushed into and along the bore of a housing constituting a companion sub-assembly, said bore having diameter less by a calculated amount than the outer diameter of the helical spring. The shaft, rod, etc. of said first mentioned sub-assembly may have clearance or even loose fit in said bore but, responsive to said sub-assemblies being assembled one to the other, it (said shaft, rod, etc.) is securely locked against axial displacement by friction gripping forces exerted in radial outward direction on the bore surface by each coil of the multi-coil helical spring acting in torsion. conversely, the invention provides a shaft, rod, tube or tube-end sub-assembly which in its simplest form may be and preferably is devoid of any surface irregularity such as a step or groove as aforesaid and which, responsive to its more or less forceful insertion in the bore of a housing component or sub-assembly in which the multi-coil helical spring is held in place by a groove-seated retaining ring, is secured against axial separation by gripping forces exerted in radial inward direction on the outer cylindrical surface of said shaft, rod or tube by said multi-coil helical spring acting in torsion.

To facilitate assembly of the aforesaid sub-assemblies by insertion of one into the other as described, the housing of the first-described sub-assembly is provided at the entry end of its bore with a chamfer and the shaft, rod, tube, etc. of the converse form of sub-assembly at the entering end thereof is similarly chamfered.

DETAILED DESCRIPTION

Illustrative embodiments of the invention are shown in the accompanying drawings, wherein FIG. 1 is a view in side elevation with parts thereof i.e. the multi-coil helical spring and the groove-seated retaining ring components showing in vertical-plane section, of a form of sub-assembly which according to the invention is to be secured to the bore surface of a housing; with FIG. 1A being an end view thereof;

Figure 1:
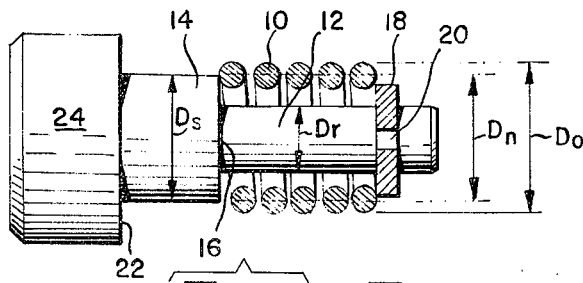
Figure 4:
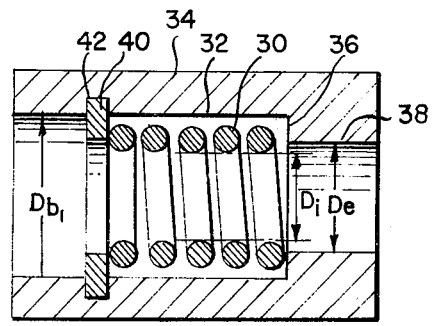
Figure 2:
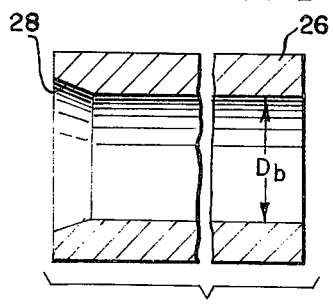
FIG. 2 is a foreshortened view in vertical-plane section of the housing constituting a companion sub-assembly designed for the reception of the sub-assembly shown in FIGS. 1 and 1A.
Figure 5:
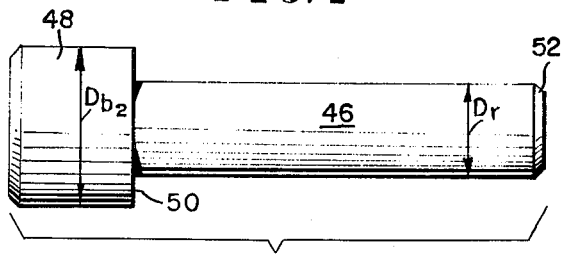
Figure 3:
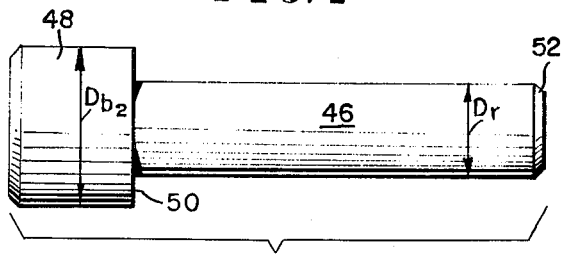
FIG. 3 is a view partly in side elevation and partly in vertical-plane section of the coil-spring-fastened assembly.
Figure 6:
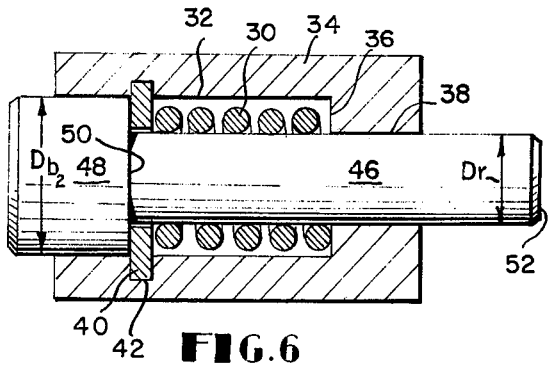
Figure 7:
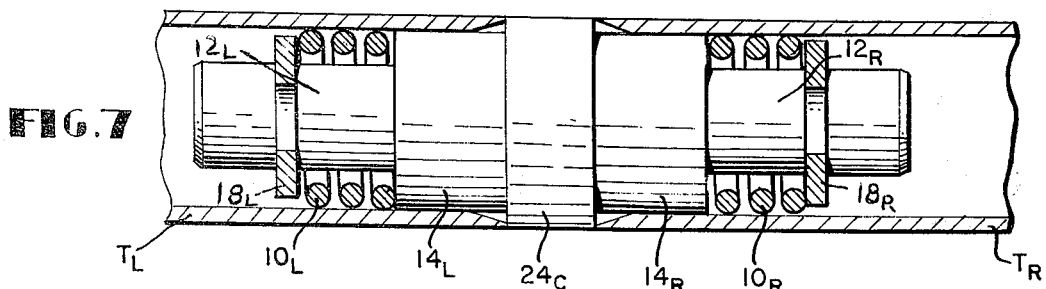
Figure 8:
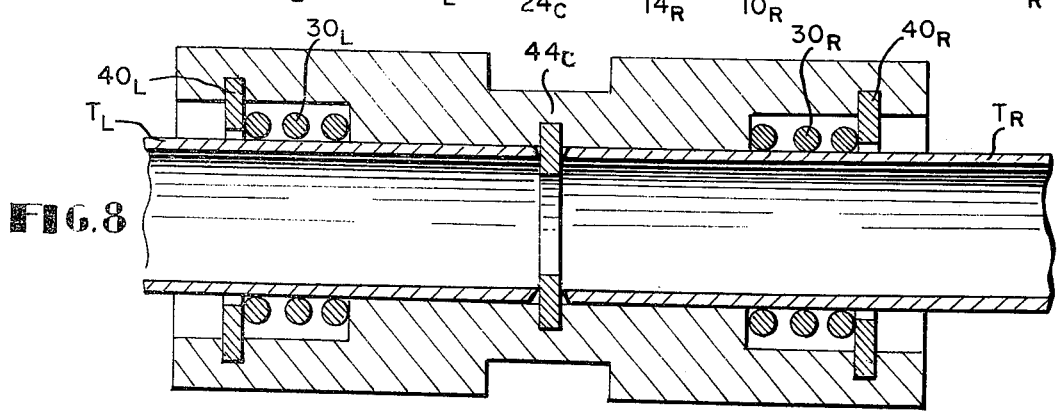

FIGS. 4, 5 and 6 are views corresponding respectively to FIGS. 1, 2 and 3 which illustrate the converse arrangement of sub-assemblies according to which the multi-coil helical spring grips to the outer smooth surface of a shaft, rod, tube outer surface, etc. responsive to assembly of the sub-assemblies one to the other; and FIGS. 7 and 8 are vertical-plane sections which illustrate the invention applied as a coupling serving to couple the ends of coaxially related thin-wall tubing.

Figure 1A:
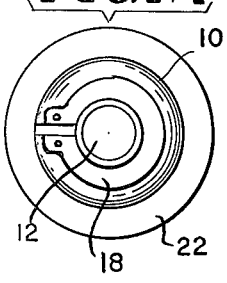

Referring to the drawings, and first considering the FIGS. 1–3 inclusive embodiment of the invention, reference numeral 10 (FIG. 1) designates a multi-coil helical spring mounted in encircling relation on the end-length portion 12 of a stepped-diameter shaft or rod 14, whereon said multicoil spring is held in an unstressed state between the step or shoulder 16 which is disposed intermediate the shaft or rod proper 14 and its said end-length portion 12, and an artificial shoulder consisting of an open-ended spring retaining ring 18 (FIG. 1A) of well-known construction and function spring-seated in an outwardly opening groove 20 machined or otherwise provided in said end-length portion 12 of the shaft or rod.

According to the invention, the helical spring 10 which initially has uniform neutral diameter $D_n$, more importantly has an outer diameter $D_o$ which is substantially larger than the diameter $D_r$ of said end-length portion 12 of the shaft or rod and also larger by a calculated amount than the diameter $D_s$ of said shaft or rod proper, which latter is substantially that of the diameter $D_b$ of the bore of a housing 26 (FIG. 2) into which the sub-assembly according to FIG. 1 is designed to be inserted, as by being bodily pushed thereinto to a depth determined by the engagement of the under surface 22 of the shaft- or rod-head 24 with the end edge of said housing 26.

Responsive to such insertion, the outer diameter $D_o$ of the multi-coil helical spring 10 must of necessity be reduced to the diameter $D_b$ of the housing bore, and such causes said spring 10 to perform like a torsion spring and in so doing each of its several coils exerts a frictional gripping force on the housingbore surface, which in total yields a relatively high resistance to axial displacement as compared to other self-locking devices.

Because the diameter $Dr$ of the end-length portion 12 of the shaft or rod encircled by the multi-coil spring 10 is smaller than the diameter of said spring in its compressed state as just described, and by designing the shaft proper 14 so that it has loose or slide fit relative to housing-bore diameter $Db$, it will be appreciated that there results a shaft sub-assembly which is able to turn relatively freely when assembled as illustrated in FIG. 3, but which is secure against relatively high axial displacement forces. Also by providing that the outer diameter of the retaining ring 18 is only slightly less than the housingbore diameter $Db$, the ring is secure against falling from its groove when the shaft or rod sub-assembly is being disassembled from the companion housing-bore sub-assembly. Thus, assembly and disassembly may be affected many times as needed without seriously affecting its holding power.

The aforementioned insertion (and re-insertion) of the sub-assembly as shown in FIG. 1 into the bore of the housing 26 constituting the companion sub-assembly may be facilitated by providing the end of the housing first to receive the firstmentioned sub-assembly according to FIG. 1 with a chamfer 28 which reduces the force necessary to overcome the resistance of the spring coils to being compressed as they enter the housingbore.

Referring now to the embodiment of the invention according to FIGS. 4–6 inclusive (such being hereinbefore referred to as the converse arrangement to that of FIGS. 1–3), here the multicoil spring and retaining ring are components of the housing sub-assembly, rather than of the shaft or rod sub-assembly. More in detail, a multi-coil spring 30 is located within the enlarged-diameter bore portion 32 having diameter $Db_1$ of a housing 34, which extends from one end of the housing to a step or shoulder 36 therein which separates said bore portion 32 from a small-diameter bore-end portion 38 having diameter $De$. According to the invention, said multi-coil spring 30 is held in a normally unstressed state between said step 36 and an integral retaining ring 40 spring seated in an inwardly opening groove 42 and forming an artificial shoulder projecting into said bore portion 32.

By design, the internal unstressed diameter $Dd$ of the helical spring coil 30 is smaller than the diameter $Dr$ of the shaft or rod 46 which constitutes, with its enlarged-diameter head 48 whose underface provides a stop surface 50, a companion sub-assembly. Thus, when said shaft or rod sub-assembly is pushed into and thru the end-to-end opening of the spring 30 to a depth such that the underface 50 of its head 48 (which has diameter $Db_2$ corresponding generally to the housing-bore diameter $Db_1$) abuts the inwardly projecting, artificial shoulder formed by the groove-seated spring retaining ring 40 (in which position the opposite end of the shaft or rod having diameter $Dr$ extends through the smaller-diameter end 38 of the housing-bore having corresponding diameter $De$) each of the plural coils of the spring 30 exerts a gripping force of substantial magnitude on the shaft or rod surface, i.e. the spring self-locks itself to said shaft or rod surface, and thereby secures the sub-assemblies one to the other and against axial separation.

Just as the housing-end chamfer 28 facilitates assembly of the sub-assemblies according to FIGS. 1–3 embodiment one to the other, the shaft or rod-end first to enter the opening through the multi-coil helical spring 30 according to FIGS. 4–6 embodiment is also provided with a chamfer, such being designated 52.

Referring now to FIGS. 7 and 8, the said FIG. 7 illustrates the invention applied in highly useful manner to couple the ends of co-axially related, non-communicating tubes of such thin wall construction that grooving, shouldering or even threading thereof is not permissible. More in detail, FIG. 7 typifies a coupling wherein multi-coil helical springs 10L and 10R (each corresponding to the multi-coil helical spring 10 of the FIGS. 1–3 form thereof) are disposed in encircling relation on oppositely extending end portions 12L and 12R of stub shafts or rods corresponding in all substantial respects to the shaft or rod end-length portions 12 of said FIGS. 1–3 form, except that said stub shaft or rod portions 12L and 12R extend in opposite directions from intermediate diameter portions 14L and 14R of a coupling member generally designated 24C. It will be understood that the multi-coil helical springs 10L and 10R grip with substantial force to the inner surfaces of the tube ends $T_L$ and $T_R$, which surfaces correspond to the bore surface of the housing 26 of the FIGS. 1–3 form.

Similarly, FIG. 8 typifies a tube-end to tube-end coupling means interposed between co-axially related and illustratively communicating ends of tubes $T_L$, $T_R$ of such thin-wall construction that grooving, threading, shouldering, etc. is not permissible, said FIG. 8 form of coupling means utilizing the concept of the housing-to-rod end embodiment described in detail in connection with the FIGS. 4-6 embodiment, differing therefrom only in that the coupling means relies on left and right hand tube-end gripping means, i.e. inwardly projecting groove-seated retaining rings 40L, 40R and multi-coil helical springs 30L, 30R (mounted as shown in a common coupling sleeve 44C) which grip to the outer, smooth surfaces of the tube ends $T_L$ and $T_R$, responsive to axial insertion of said ends into and through the coil spring openings.

Without further analysis, it will be appreciated that the invention may take the various structural forms illustrated and described, as well as such other forms as will be apparent to persons skilled in the art. Accordingly, it is to be understood that the scope of the invention is to be measured not only by the forms herein illustrated, but also by any additional species or forms which fall within the spirit and meaning of the following claims.

What is claimed is:

1. A multi-coil helical spring-fastened assembly comprising, in combination, a first sub-assembly and a companion sub-assembly, said sub-assemblies being self-locked one to the other responsive to one thereof being assembled to the other by being inserted in a cylindrical bore with which said other sub-assembly is provided, said one sub-assembly comprising a stepped-diameter shaft-form member; the smaller-diameter end of which is provided with a ring-seating circumferential groove, a conventional open-ended spring-retaining ring mounted in said groove and providing an artificial shoulder thereon, a multi-coil helical spring positioned between the step of said shaft-form member and said groove-seated retaining ring, said multi-coil helical spring having initially substantially uniform outer diameter such that it is compressed responsive to assembly of said sub-assemblies as aforesaid and when so compressed it exerts gripping force in radial outward direction on a facing cylindrical bore surface of said companion sub-assembly.

* * * * *